US007921222B2

(12) United States Patent
Courtemanche

(10) Patent No.: US 7,921,222 B2
(45) Date of Patent: Apr. 5, 2011

(54) METHOD AND SYSTEM FOR FAST CHANNEL SWITCHING USING STANDARD RTSP MESSAGES

(75) Inventor: Marc Courtemanche, Montreal (CA)

(73) Assignee: Vantrix Corporation, Montreal, Quebec (CA)

( * ) Notice: Subject to any disclaimer, the term of this patent is extended or adjusted under 35 U.S.C. 154(b) by 242 days.

(21) Appl. No.: 12/116,069

(22) Filed: May 6, 2008

(65) Prior Publication Data

US 2009/0282158 A1 Nov. 12, 2009

(51) Int. Cl.
*G06F 15/16* (2006.01)
(52) U.S. Cl. ........ 709/231; 709/219; 709/228; 709/224; 709/220; 725/118; 725/62; 370/328; 370/432; 370/431; 370/389
(58) Field of Classification Search .................. 709/231, 709/220, 219, 228, 224
See application file for complete search history.

(56) References Cited

U.S. PATENT DOCUMENTS

| | | | |
|---|---|---|---|
| 2007/0266122 A1 | 11/2007 | Einarsson | |
| 2008/0107108 A1 | 5/2008 | Bouazizi | |
| 2008/0109853 A1* | 5/2008 | Einarsson et al. | 725/62 |
| 2009/0219848 A1* | 9/2009 | Lohmar et al. | 370/312 |

FOREIGN PATENT DOCUMENTS

| | | |
|---|---|---|
| EP | 1646199 A1 | 4/2006 |
| WO | 2006/084503 A1 | 8/2006 |
| WO | 2006/096104 A1 | 9/2006 |
| WO | 2007/149029 A1 | 12/2007 |
| WO | 2008/029230 A2 | 3/2008 |

OTHER PUBLICATIONS

Real Time Streaming protocol (RTSP), Request for Comments (RFC) 2326, H. Schulzrinne et al., published by IEFT (Internet Engineering Task Force), Apr. 1998.
Real Time Streaming Protocol, Wikipedia published on-line at "http://en.wikipedia.org/wiki/Real_Time_Streaming_Protocol" prior to May 1, 2008.

* cited by examiner

*Primary Examiner* — Jude J Jean Gilles
(74) *Attorney, Agent, or Firm* — IP-MEX Inc.; Victoria Donnelly

(57) ABSTRACT

Method and system for performing fast channel switching in client-server systems, in which live media streams sent by a streaming server under the RTSP protocol are played by the client, are described. The seek functionality in the media player is overloaded to provide switching between live media streams by using standard RTSP message in-band within a single RTSP session.

23 Claims, 10 Drawing Sheets

METHOD AND SYSTEM FOR FAST CHANNEL SWITCHING USING STANDARD RTSP MESSAGES

FIELD OF THE INVENTION

The invention relates to the field of media stream management, and in particular, to a method and system for fast channel switching from one live media stream to another by using Real Time Stream Protocol (RTSP) messages.

BACKGROUND OF THE INVENTION

With the continuous improvement in computing and communication technologies viewing media streams on demand is becoming increasingly popular. A client-server paradigm with a streaming server transmitting the media stream selected by an end-user associated with a client device, to be also referred to as client, is often used for supporting such applications. Various types of client devices may be deployed by users. These include desktop computers, television sets as well as mobile wireless devices such as cell phones and personal digital assistants. Typically, such a client device is associated with a media player that provides the end-user with the interface required for interacting with the streaming server. Both stored media streams, such as movies available at the streaming server, or live media streams, including sporting events and live concerts distributed in real time by the streaming server, are viewed by end-users.

A Real Time Streaming Protocol (RTSP), also referred to as standard RTSP, is typically used in supporting the client-server communication in case of both types of systems that handle stored as well as live media streams, see, for example a Request for Comments (RFC) 2326 of the Internet Engineering Task Force (IETF) "Real Time Streaming Protocol (RTSP) by Schulzrinne et al. dated April 1998. RTSP allows a client to control the transmission of channels, each of which corresponds to a media stream provided by the streaming server. The client uses Video Cassette Recorder (VCR)-like commands, such as play and seek, for accessing media streams on streaming servers. The actual transmission and reception of the media streams, however, are not part of RTSP that focuses on controlling the viewing of the media streams by the client. Most RTSP servers deploy the Real Time Transport Protocol (RTP) as the transport protocol for the actual transmission of audio/video data. A number of RTSP messages are described below, see, for example an article in Wikipedia entitled "Real Time Streaming Protocol" published on-line at the URL "http://en.wikipedia.org/wiki/Real_Time_Streaming_Protocol" before the priority date of the present invention.

DESCRIBE: This message is sent typically for launching a RTSP session. The message includes a RTSP URL required for identifying the media stream to be played and the type of reply data that can be handled. The reply to this message includes the description of the multimedia session prepared by using the Session Description Protocol (SDP). SDP is a protocol used for describing multimedia sessions for session announcement, session invitation, and other forms of multimedia session initiation. The session description includes a list of the media streams controlled with the help of the URL specified in the DESCRIBE message. Typically, there is one media stream for audio and a separate media stream for video.

SETUP: This message specifies how a single media stream must be transported. This is used before a play request is sent by the client to the streaming server. The request contains the media stream URL and a transport specifier that includes a local port for receiving RTP data corresponding to the audio or the video stream.

PLAY: This message is sent by the client to play a media stream. Multiple PLAY requests can be sent in succession. The URL associated with this request may be an aggregate URL when the client wishes to play all media streams, or a single media stream URL when the client wishes to play only a single stream. A range parameter included with the PLAY request is used to determine the point in the media stream from which transmission is to begin. If no range is specified, the stream is played from the beginning to the end.

TEARDOWN: This message is used to terminate an existing RTSP session. It stops all media streams and clears all data related to the RTSP session on the streaming server.

Viewers of live media streams may desire to switch from a channel currently being viewed to a new channel. Systems that use the standard RTSP protocol may need to terminate an existing RTSP session and start a new RTSP session for playing the new channel desired by the client. This disruptive and delay causing process can lead to a dissatisfied user. Although extensions to the RTSP protocol are being proposed for performing fast channel switching (FCS) within the existing RTSP session, most existing media players are not equipped to deal with this new extension to the RTSP protocol. Moreover, handling the extension to the RTSP protocol often requires additional resources, which may not be available for resource constrained mobile devices.

Thus, there is an existing need in the industry for an improved and effective method and system for fast channel switching of live media streams using existing control messages, which would avoid or mitigate the deficiencies of the prior art.

SUMMARY OF THE INVENTION

Therefore there is an object of the present invention to provide an improved method and system for fast channel switching between live media streams.

According to one aspect of the invention, there is provided a method for switching between channels carrying live media streams transmitted from a streaming server to a client comprising a media player under a Real Time Streaming Protocol (RTSP), the method comprising the steps of: (a1) launching a RTSP session by sending a RTSP message from the client to the streaming server for enabling channel switching within the RTSP session, the RTSP message including information regarding a playlist file stored at the streaming server, the playlist file comprising a list of channels available for playing by the media player; (b1) at the client, processing a request for switching from an original channel being played by the media player to a new channel from the playlist file, and sending another RTSP message including information regarding the new channel to the streaming server in-band within the RTSP session; and (c1) processing said another RTSP message of step (b1) at the streaming server for transmitting the new channel to the client.

The step (b1) further comprises: (a2) overloading a seek functionality available in the media player to move backward and forward in a media stream stored in a computer readable medium, for triggering a request for channel switching and generating said another RTSP message.

The step (a2) further comprises: (a3) at the client, receiving a seek request including a seek interval with an endpoint corresponding to an index of the new channel in the playlist file from the media player for switching to the new channel; (b3) determining a range parameter corresponding to the index of the new channel in the playlist file from the seek interval received in step (a3); and (c3) sending a PLAY RTSP message from the client to the streaming server including the range parameter computed in step (b3).

The step (c1) further comprises: (a4) identifying the new channel in the playlist file by processing the information regarding the new channel included in the RTSP message received from the client sent in step (b1); and (b4) stopping the transmission of the original channel and transmitting the new channel to the client without interruption of the RTSP session.

The method further comprising the step of sending a response to the initial RTSP message sent in step (a1) from the streaming server, specifying a maximum duration of the RTSP session for overloading a seek functionality provided by the media player, the step being performed before the step (b1) and the step of processing the new channel transmitted by the streaming server at the client, the step being performed after the step (c1).

The step of processing the new channel comprises buffering the new channel at the client, and playing it immediately after the remaining part of the original channel that has arrived at the client is completely played out.

According to another aspect of the invention, there s provided a method for switching between channels carrying live media streams transmitted from a streaming server to a client under a Real Time Streaming Protocol (RTSP), the method comprising the steps of: (a8) launching a RTSP session by sending a RTSP message from the client to the streaming server for enabling channel switching within the RTSP session, the RTSP message including information regarding a playlist file stored at the streaming server, the playlist file comprising a list of channels available for playing by the client; (b8) at the client, sending another RTSP message for switching from an original channel being played at the client to a new channel from the playlist file to the streaming server in-band within the RTSP session, said another RTSP message including information regarding the new channel; and (c8) processing said another RTSP message sent in step (b8) at the streaming server for transmitting the new channel to the client.

The step (b8) further comprises: (a9) overloading a seek functionality available at the client to move backward and forward in a media stream stored in a computer readable medium, for triggering a request for channel switching and generating the RTSP message.

The step (a9) further comprises: (a10) at the client, generating a seek interval with an endpoint corresponding to an index of the new channel in the playlist file for identifying the new channel; (b10) determining a range parameter corresponding to the index of the new channel in the playlist file from the seek interval generated in the step (a10); and (c10) sending a PLAY RTSP message from the client to the streaming server including the range parameter determined in the step (b10).

The step (c8) further comprises: (a11) identifying the new channel in the playlist file by processing the information regarding the new channel included in said another RTSP message of step (b8); and (b11) stopping the transmission of the original channel and transmitting the new channel to the client without interruption of the RTSP session.

According to yet another aspect of the invention, there is provided a method for switching between channels carrying live media streams transmitted from a streaming server to a client including a media player under a Real Time Streaming Protocol (RTSP), the method comprising the steps of: (a12) launching a RTSP session between the client and the streaming server for streaming an original channel from a playlist comprising a list of channels for playing by the media player; and (b12) switching from the original channel to a new channel from the playlist in-band within the RTSP session, by overloading a seek functionality available in the media player to move backward and forward in a media stream stored in a computer readable medium, for triggering a request for switching between the original channel and the new channel.

The step (b12) further comprises: (a13) receiving a seek request including a seek interval with an endpoint corresponding to an index of the new channel in the playlist from the media player at the client for switching to the new channel; (b13) at the client, determining a range parameter corresponding to the index of the new channel in the playlist from the seek interval received in the step (a13); (c13) sending a PLAY RTSP message from the client to the streaming server including the range parameter determined in the step (b13); and (d13) processing the PLAY RTSP message sent in the step (c13) at the streaming server for transmitting the new channel to the client.

The step (d13) further comprises: (a14) identifying the new channel in the playlist by processing the range parameter included in the PLAY RTSP message from the client sent in the step (c13); and (b14) stopping the transmission of the original channel and transmitting the new channel to the client without interrupting the RTSP session.

According to one more aspect of the invention, there is provided a system for switching between channels carrying live media streams under a Real Time Streaming Protocol (RTSP), comprising:
a client comprising a media player;
a streaming server transmitting the live media streams to the client;
  wherein the client comprises:
  (a15) a first RTSP handler module, processing RTSP messages between the client and the streaming server for switching between channels, and launching a RTSP session by sending a RTSP message from the client to the streaming server for enabling switching between channels within the RTSP session, the RTSP message including information regarding a playlist file stored at the streaming server, the playlist file comprising a list of channels available for playing by the media player;
  (b15) a channel switching module, processing a request for switching between channels from an original channel being played by the media player to a new channel from the playlist file, and sending another RTSP message through the RTSP handler module to the streaming server in-band within the RTSP session launched by the first RTSP handler module, said another RTSP message including information regarding the new channel; and
  wherein the streaming server comprises:
  (c15) a request processing module, processing the RTSP message sent from the channel switching module for transmitting the new channel to the client.
The channel switching module further comprises:
  (a16) an interface module, receiving a seek request including a seek interval with an endpoint corresponding to an index of the new channel in the playlist file from the media player for overloading a seek functionality available in the media player for switching to the new channel; and
  (b16) a first computation module, determining a range parameter corresponding to the index of the new channel in the playlist file from the seek interval, and sending a PLAY RTSP message from the client to the streaming server including the range parameter.

The request processing module further comprises:
(a17) a second RTSP handler module, processing RTSP messages between the client and the streaming server; and
(b17) a second computation module, identifying the new channel in the playlist file by processing the information regarding the new channel included in the RTSP message from the client received by the second RTSP handler module.

Conveniently, the client further comprises a storage module for buffering the new channel and playing it immediately after the remaining part of the original channel that has arrived at the client is completely played out.

According to one more aspect of the invention, there is provided a system for switching between channels carrying live media streams transmitted under a Real Time Streaming Protocol (RTSP), comprising:
a client;
a streaming server transmitting the live media streams to the client;
wherein the client comprises:
(a19) a RTSP handler module, processing RTSP messages between the client and the streaming server for switching between channels, and launching a RTSP session by sending a RTSP message from the client to the streaming server for enabling switching between channels within the RTSP session, the RTSP message including information regarding a playlist file stored at the streaming server, the playlist file comprising a list of channels available for playing by the client; and
(b19) a channel switching module, sending another RTSP message through the RTSP handler module for switching from an original channel being played at the client to a new channel from the playlist file to the streaming server in-band within the RTSP session, said another RTSP message including information regarding the new channel; and
wherein the streaming server comprises:
(c19) a request processing module, processing the RTSP message sent from the channel switching module for transmitting the new channel to the client.

According to yet one more aspect of the invention, there is provided a system for switching between channels carrying live media streams transmitted under a Real Time Streaming Protocol (RTSP), comprising:
a client comprising a media player;
a streaming server transmitting the live media streams to the client;
wherein the client comprises:
(a20) a client fast channel switching module, launching a RTSP session between the client and the streaming server for streaming an original channel from a playlist comprising a list of channels for playing by the media player; and switching from the original channel to a new channel from the playlist in-band within the RTSP session, by overloading a seek functionality available in the media player to move backward and forward in a media stream stored in a computer readable medium, for triggering a request for switching between the original channel and the new channel; and
wherein the streaming server comprises:
(b20) a server fast channel switching module, processing the request for switching from the client fast channel switching module for transmitting the new channel to the client.

A computer program product for switching between channels, carrying live media streams transmitted under a Real Time Streaming Protocol (RTSP) from a streaming server to a client, comprising a media player, comprising a computer usable medium having computer readable program code means embodied in said medium for causing said computer to perform the steps of the method described above is also provided.

BRIEF DESCRIPTION OF THE DRAWINGS

Further features and advantages of the invention will be apparent from the following description of the embodiment, which is described by way of example only and with reference to the accompanying drawings, in which.

DETAILED DESCRIPTION OF THE EMBODIMENT OF THE INVENTION

The embodiment of the present invention focuses on fast channel switching, deployed by a client typically equipped with a media player, by using the RTSP protocol for communicating with a streaming server. Various types of devices can be used as a client including computing devices ranging from desktop to laptop computers, and Personal Digital Assistants (PDA) and cell phones. A media player deployed by the client is used to play various types of multimedia streams including audio and video. The streaming server is used for storing media streams and acting as a buffer and manager for live media streams that are displayed in real time.

Figure 1:
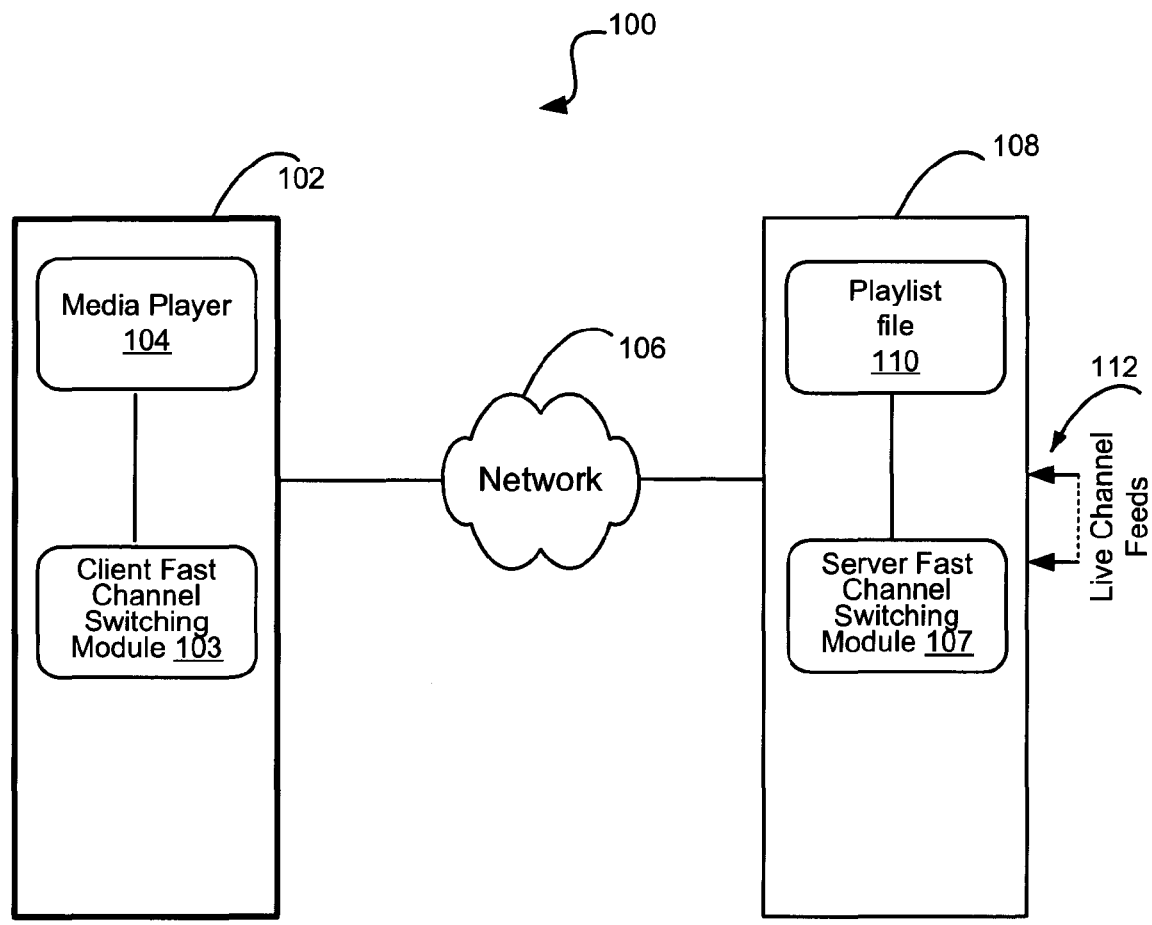
FIG. 1 illustrates a system for fast channel switching according to the embodiment of the present invention.

FIG. 1 illustrates a system 100 for fast switching of channels carrying live media streams according to the embodiment of the present invention, which includes a client 102 is communicating with a streaming server 108 via a communication network 106. The client 102 comprises a media player 104 and a Client Fast Channel Switching Module 103, and the streaming server 108 comprises a playlist file 110 and a Server Fast Channel Switching Module 107. The playlist file 110 is stored at the streaming server 108, which receives live channel feeds 112 and transmits these on demand to the client 102. The playlist file 110 contains the identity of each live stream, between which the channel switching is to be performed.

To explain the operation of the system 100, a typical use case, in which the client 102 is a mobile device used by the end-user to view live TV broadcast, is presented next.

For Mobile TV, the user experience can be improved by enabling switching of media content, or channels, without initiating a new RTSP connection. This enables the end-user to trigger a faster channel change and experience an instantaneous transition between media streams from one channel to another.

Figure 2:
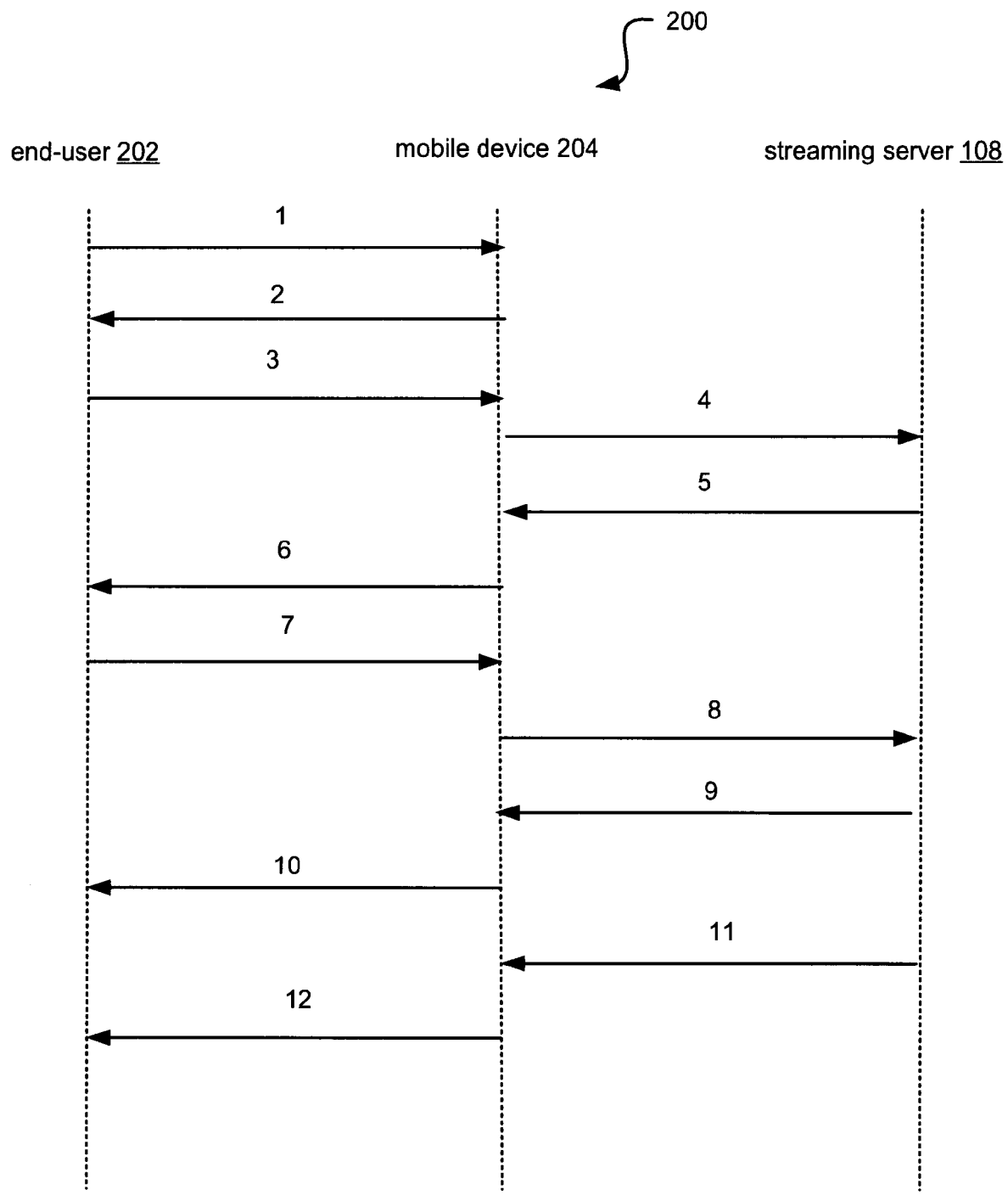
FIG. 2 shows a sequence diagram for the mobile TV use case illustrating the operation of the system of FIG. 1.

A typical Mobile TV fast channel switching (FCS) use case is explained with the help of a sequence diagram 200 presented in FIG. 2. Three actors: end-user 202, mobile device 204 acting as the client 102 and streaming server 108 are shown in the diagram 200. Mobile device 204 receives commands from the end-user 202 and communicates with the steaming server 108. Various operations performed by the end-user 202, the mobile device 204 and the streaming server 108, which are labeled by reference numerals 1-12 in FIG. 2, are explained in detail below.

1. End-user 202 launches a mobile TV player application;
2. Mobile device 204 displays a TV screen to end-user 202;
3. End-user 202 initiates viewing of a channel by clicking on an icon/link on the screen of the mobile device 204;
4. Mobile device 204 launches a RTSP session by opening a RTSP connection with the streaming server 108;
5. Streaming server 108 sends media stream to the mobile device 204.
6. Mobile device 204 displays the requested TV channel to the end-user 202.
7. For switching channels, the end-user 202 clicks the appropriate channel icon or keypad button on the screen of the mobile device 204, while still continuing to view the original channel;
8. This action of the end-user 202 triggers the mobile device 204 to send a RTSP message in-band within the existing RTSP session.
9. Streaming server 108 returns an OK message after switching the channel.
10. End-user 202 is advised by the mobile device 204 that the channel switching from the original channel to the new channel requested by the end-user 202 is in progress;
11. Streaming server 108 sends the new channel to the mobile device 204. Please note that even though the new channel is being streamed to the mobile device 204, the end-user 202 continues to view the original channel until the remaining seconds of the original channel that has already arrived are played out;
12. Mobile device 204 displays the new channel to the end-user 202, who experiences an instantaneous switch between the two channels and starts viewing the new channel.

The embodiment of the invention performs live media channel switching without interrupting the current RTSP session or the media session that transfers the actual content to the end-user. In order to perform such a fast-channel switching between live media streams within an existing RTSP session without requiring FCS-specific media player extensions or protocol exchanges outside of this RTSP session, in the embodiment of the invention the "seek" functionality of the media player 104, which is present in most media players, is overloaded with a new functionality to trigger the switching of live media streams. Please note that the "seek" functionally of media players is used for stored media streams, such as movies, to perform a fast-forward operation (moving forward in the stored media stream), or a rewind operation (moving backward in the stored media stream). Because such operations are not applicable to live media streams, no functionality is lost when the available "seek" functionality is adapted for supporting FCS between live streams. This functionality is exposed through most media player Software Development Kits (SDKs), and is effectively utilized for achieving fast channel switching.

The embodiment of the invention uses a list of channels that are to be played at the client 102 stored in a playlist file 110 at the streaming server 108. A basic functionality of the media player 104 is enabled by mapping a "seek" operation to a set of indices in the list of channels based on a seek time value. The client 102 receives a request from the end-user 202 to switch from the original channel currently being viewed to the new channel, and uses the "seek" functionality in the media player 104 to identify the new channel requested for the streaming server 108. The endpoint of a specific seek interval is mapped to the position of a channel in the playlist file 110. The seek interval jumps by k units, where k is the interval between seek times corresponding to a single channel index jump, e.g. k=1 sec. As described below, the endpoint of a given seek interval can be used to generate an integer that corresponds to the index of the new channel in the playlist file 110. A RTSP PLAY message including a range parameter for the seek interval, corresponding to the position of the new channel in the playlist file 110, is sent from the client 102 to the streaming server 108. When a mid-stream RTSP PLAY request is used with a corresponding range parameter including an "npt" interval start s, the channel index i is obtained at the streaming server 108 as follows:

$$i = \text{round}(s/k) - (1) \tag{1}$$

The round function in equation 1 rounds up the real value to its nearest integer. In order for this basic functionality to enable FCS, it needs to be understood by the streaming server 108, which in turn, should have knowledge of the list of channels over which the FCS is to be performed. The list of channels is conveyed to the streaming server 108 by addressing the initial RTSP request to a playlist file 110, e.g. channels.pls, containing the list of channels (ordered by index) across which the FCS will be supported.

An initial DESCRIBE RTSP message is used for launching the RTSP session. This message is also used to inform the streaming server 108 that the FCS should be enabled on the playlist file 110 named in the message and to identify the channel index that should be used for initial playback by including appropriate RTSP URL parameters:

rtsp://rmss/channels.pls?fcs=true&start=3

Finally, in order to enable the "seek" functionality at the media player 104, even though the streams may be live, the streaming server 108 returns a lengthy, but finite time duration value T, for the stream within the SDP. This value is chosen to exceed the maximum length of time that any given client could be expected to continuously play a given channel, e.g. 8 hours. It should be noted that, because every channel switching will effectively reset the current viewing point in the stream to a small time value (less than k*maximum channel index), it is unlikely that this time duration T will ever be reached.

Figure 3A:
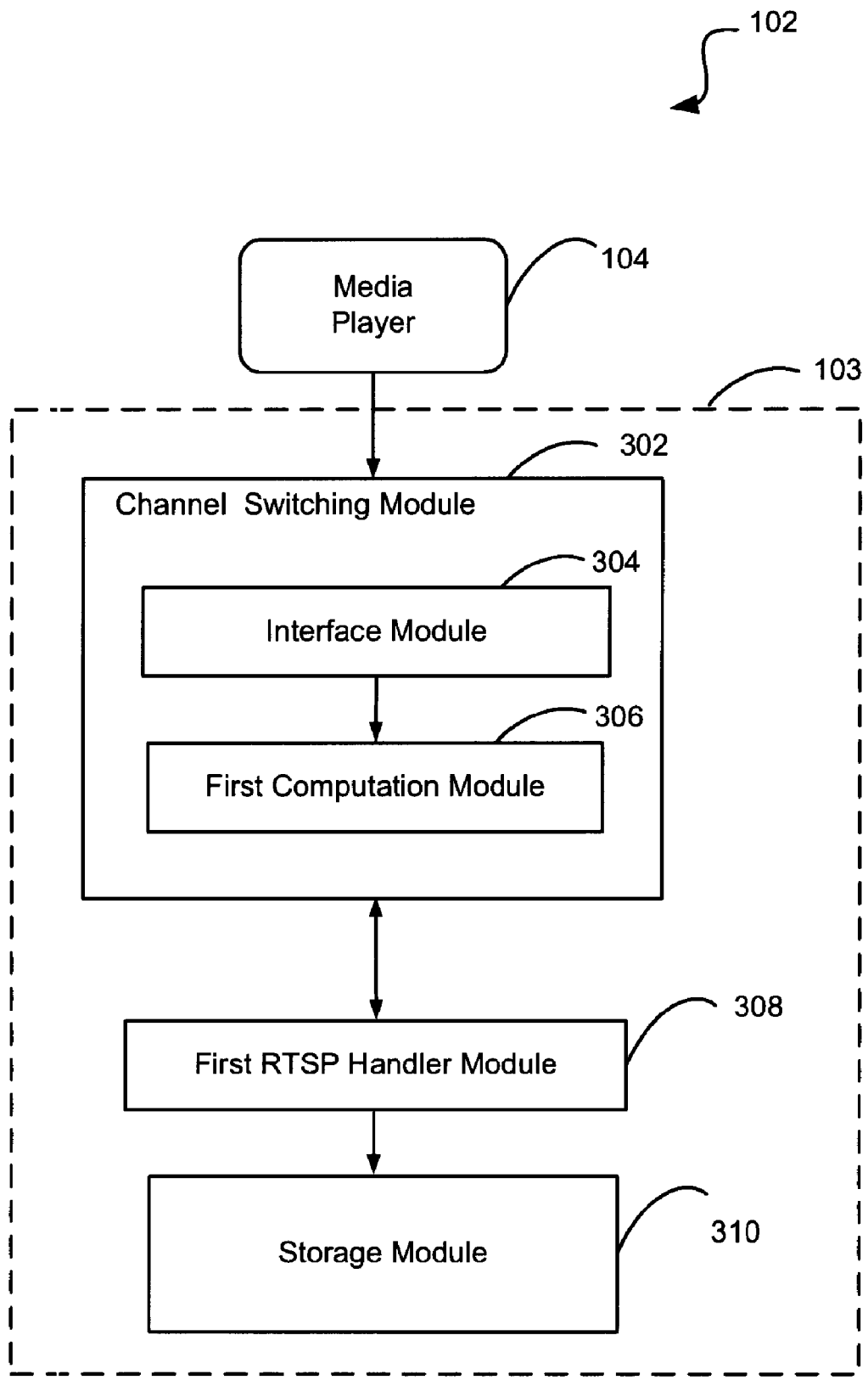
FIG. 3a illustrates functional components of the client of the system of FIG. 1.
Figure 3B:
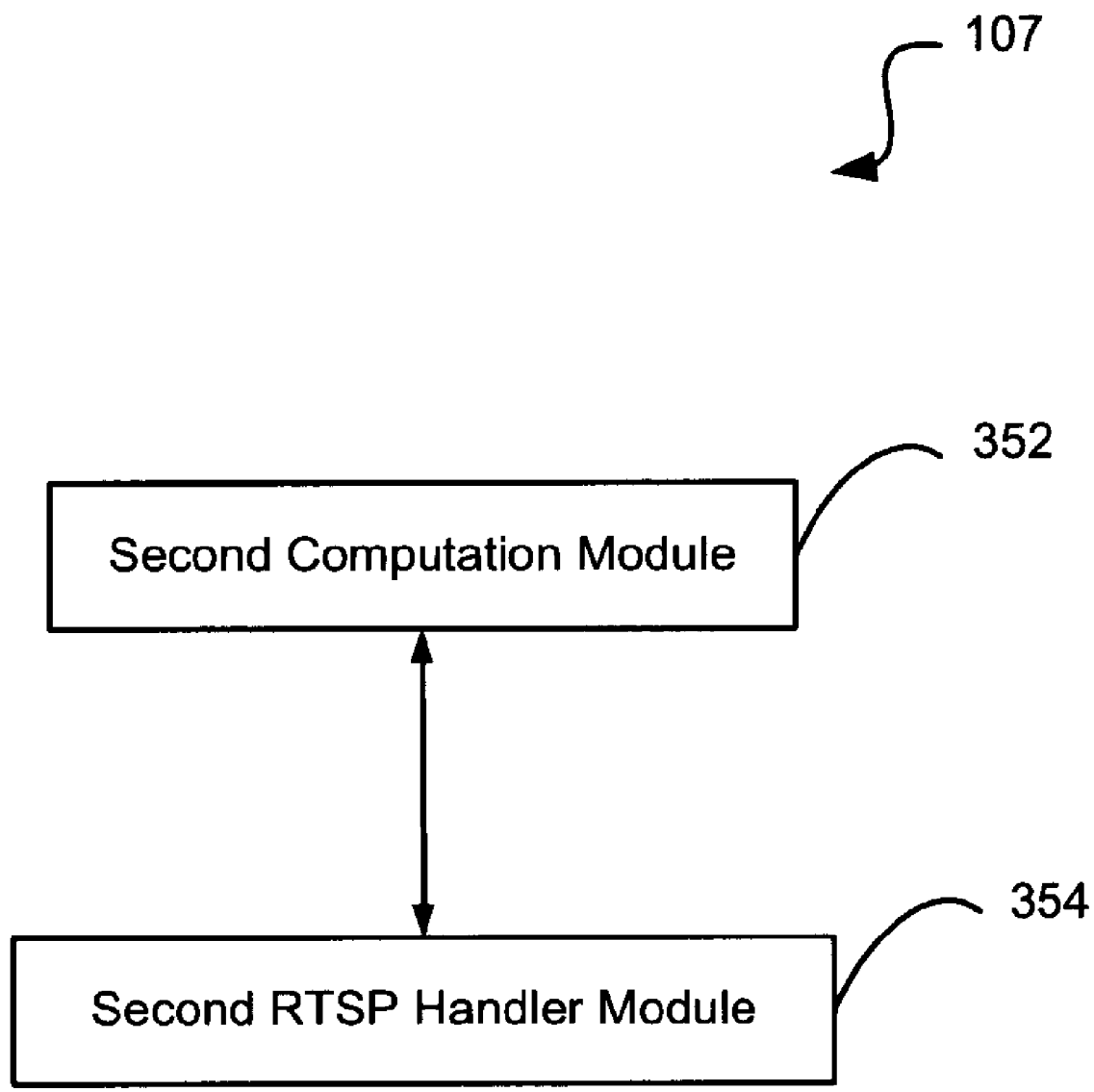
FIG. 3b illustrates functional components of the streaming server of the system of FIG. 1.

Functional components of the Client Fast Channel Switching Module 103 deployed at client 102 and the Server Fast Channel Switching Module 107 deployed at the streaming server 108 are shown in FIGS. 3*a* and 3*b* respectively, and include modules comprising a firmware or alternatively a computer software code stored in a computer readable medium. FIGS. 3*a* and 3*b* also capture a flow of control messages, which are shown by arrows between the modules. The functional components at the client 102 of the presented in diagram 300 of FIG. 3*a* are as follows:

Channel Switching Module 302, which is used for receiving the seek interval the endpoint of which is used for identifying the new channel and handling the channel switching operation in cooperation with the streaming server 108. It includes an Interface Module 304 and a First Computation Module 306 that are discussed next;

Interface Module 304 for communicating with the media player 104 used by the end-user 202 for viewing the channels carrying live media stream;

First Computation Module 306, which is used at the client 102 for computing the range parameter associated with the channel switch;

First RTSP Handler Module 308, which is used for launching a RTSP session and handling the RTSP messages exchanged by the client 102 and the streaming server 108 for achieving fast channel switching; and Storage Module 310, which is included in one embodiment of the invention for buffering data from the streaming server 108 to achieve a smooth and seamless transfer from the original channel to the new channel at the client 102. In an alternate embodiment the storage module is provided by the media player.

Functional components at the streaming server 108 are presented in diagram 350 of FIG. 3b.

Second Computation Module 352, which is used at the streaming server 108 for computing the index of the new channel from the range parameter included in the PLAY RTSP message sent from the client 102; and Second RTSP Handler Module 354, which is used for handling the RTSP messages exchanged by the streaming server 108 and the client 102 for achieving fast channel switching.

Figure 4:
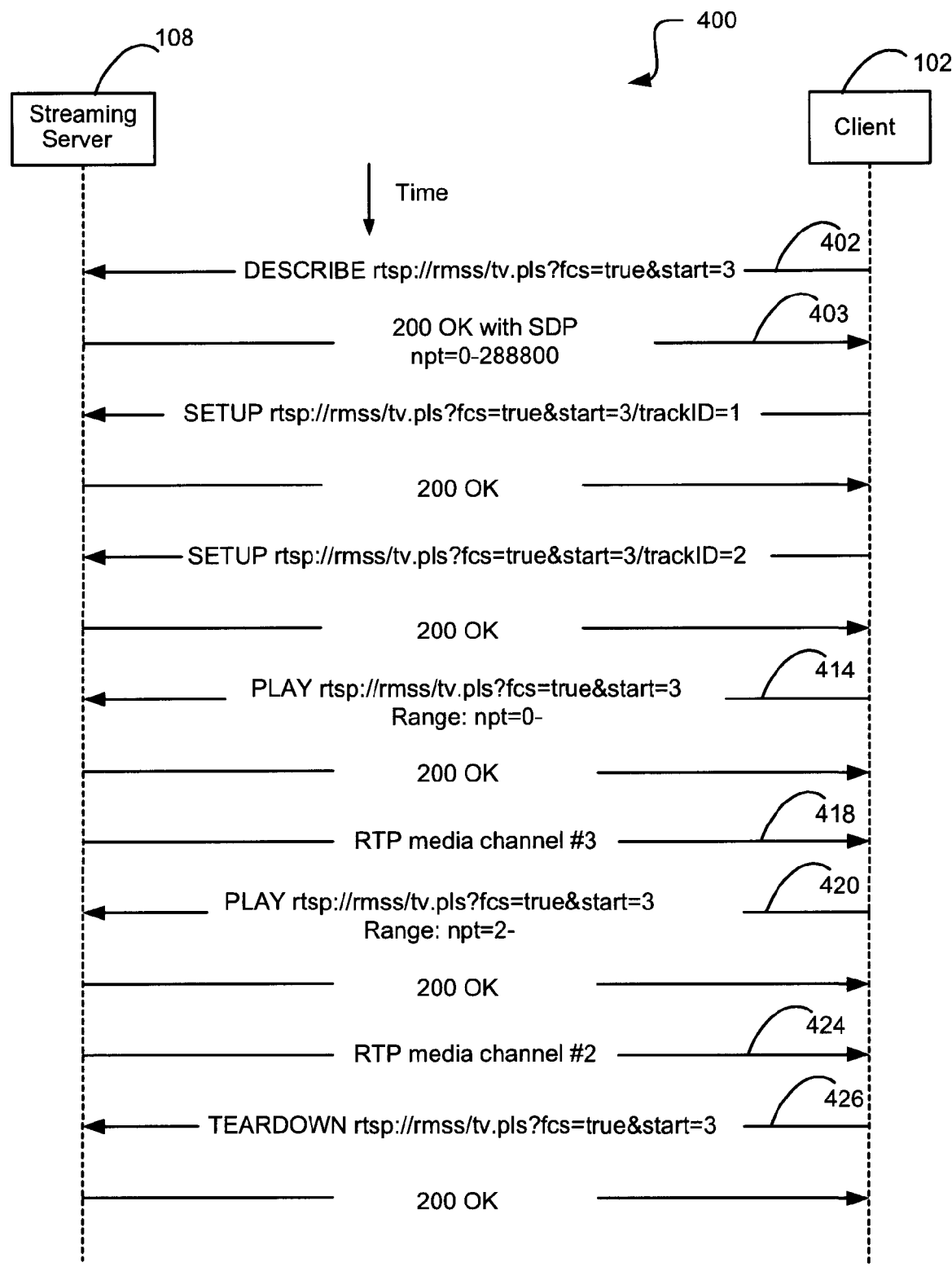
FIG. 4 displays a typical message exchange between the client and the streaming server.

A typical set of message exchanges between the client 102 and the streaming server 108 is presented in diagram 400 of FIG. 4. Please note that time increases as we go down in the diagram. Only a key set of messages that are relevant for explaining the method for fast switching of channels carrying live media stream according to the embodiment of the invention are discussed. The RTSP session is launched with an initial DESCRIBE RTSP message 402. This message 402 sets "fcs" to "True" to indicate the client's desire to perform fast channel switching, and the playlist file 110 with name tv.pls is identified in the message. The streaming server 108 sends the message 403 as a positive acknowledgment ("200 OK"), and also sends a large "npt" interval for enabling the "seek" functionality in the media player 104 as discussed earlier. The initial channel to be played is indicated as channel #3 in the first PLAY RTSP message 414. The streaming server 108 uses the RTP protocol to send the media channel #3 in message 418. The second PLAY RTSP message 420 is sent from the client 102 to perform fast channel switching from the original channel #3 to the new channel #2. The streaming server 108 stops the transmission of channel #3, and starts sending channel #2 by using the RTP protocol in message 424. The RTSP session goes on as long as the end-user 202 wants to play the channel #2, and terminates when the TEARDOWN RTSP message 426 is sent by the client 102 to the streaming server 108.

The steps of the method for fast channel switching of the embodiment of the invention are explained in further detail with the reference to flowcharts presented in FIGS. 5-9.

The steps of the method performed by the client 102 are explained first followed by description of the steps executed by the streaming server 108.

Figure 5:
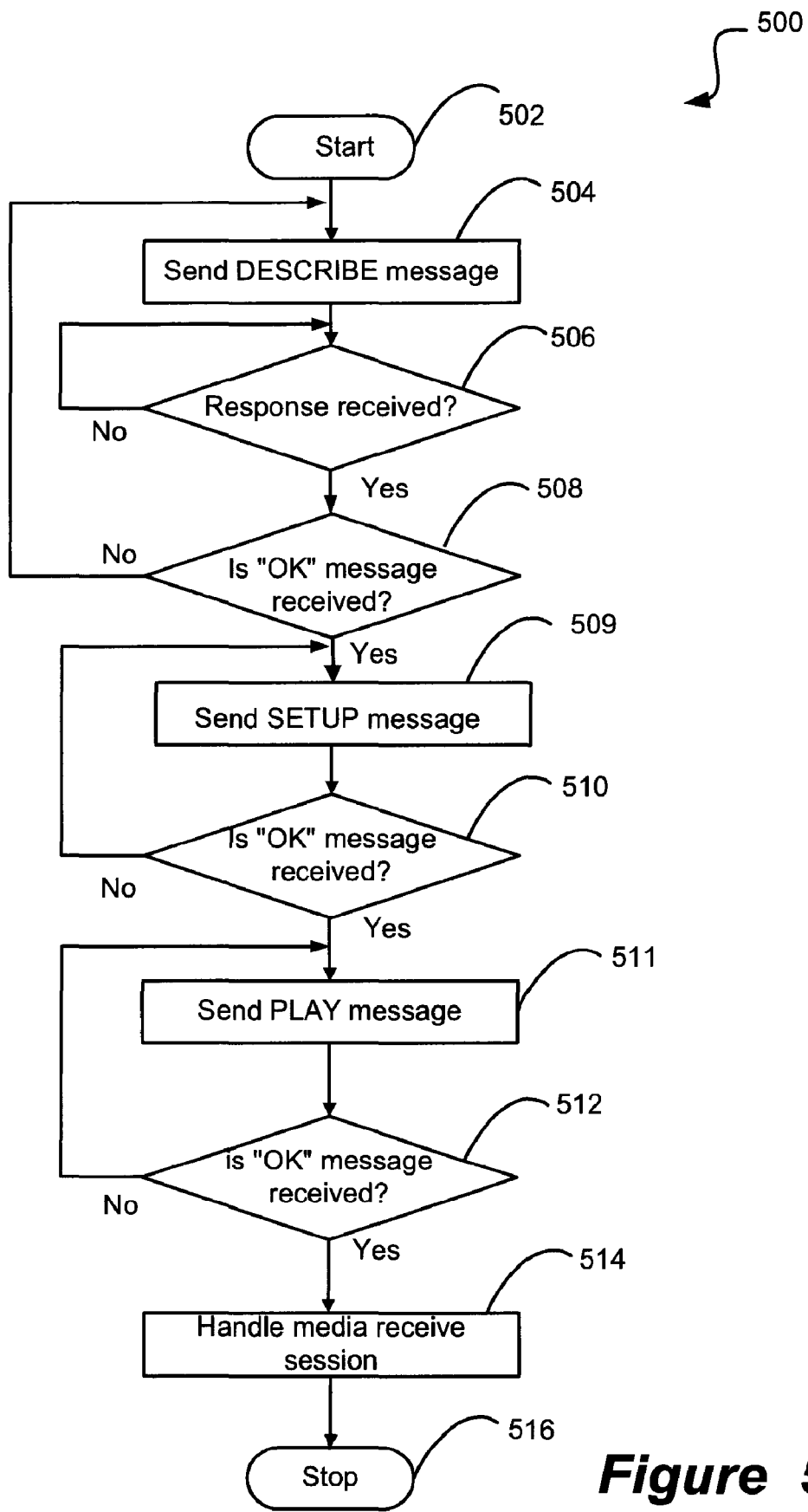
FIG. 5 shows a flowchart illustrating the steps of the method for fast channel switching deployed at the client.

Flowchart 500 presented in FIG. 5 concerns the operations performed at the client 102. Upon start (box 502), the procedure 500 sends an initial DESCRIBE RTSP message to the streaming server 108 (box 504) for starting a RTSP session. It then checks whether or not a response from the streaming server 108 is received (box 506). If the response is not received it exits "No" from box 506 and loops back to the entry of box 506. If the response from the streaming server 108 has arrived it exits "Yes" from box 506, and checks if an "OK" message was received (box 508). Please note that an "OK" message signifies a positive acknowledgment from the streaming server 108. If an "OK" message was not received it exits "No" from box 508 and loops back to the entry of box 504. Otherwise it exits "Yes" from box 508 and sends a SETUP RTSP message to the streaming server 108 and waits for a response from the streaming server 108 (box 509). Please note that for avoiding cluttering in FIG. 5 we have not separately shown the iterative loop (similar to that captured in box 506) used for waiting for the response from the streaming server 108 to arrive. After receiving the response, the procedure 500 checks if an "OK" message was received (box 510). If not, it exits "No" from box 510 and loops back to the entry of box 509. Otherwise it exits "Yes" from box 510 and sends a PLAY RTSP message to the streaming server 108 and waits for a response (box 511). Once again, for avoiding cluttering, the iterative loop used to wait for the response is not shown separately. After receiving the response, the procedure 500 checks if an "OK" message was received (box 512). If not, it exits "No" from box 512 and loops back to the entry of box 511. Otherwise the procedure 500 exits "Yes" from box 512 and proceeds to handle the media receive session (box 514), and exits (box 516).

Figure 6:
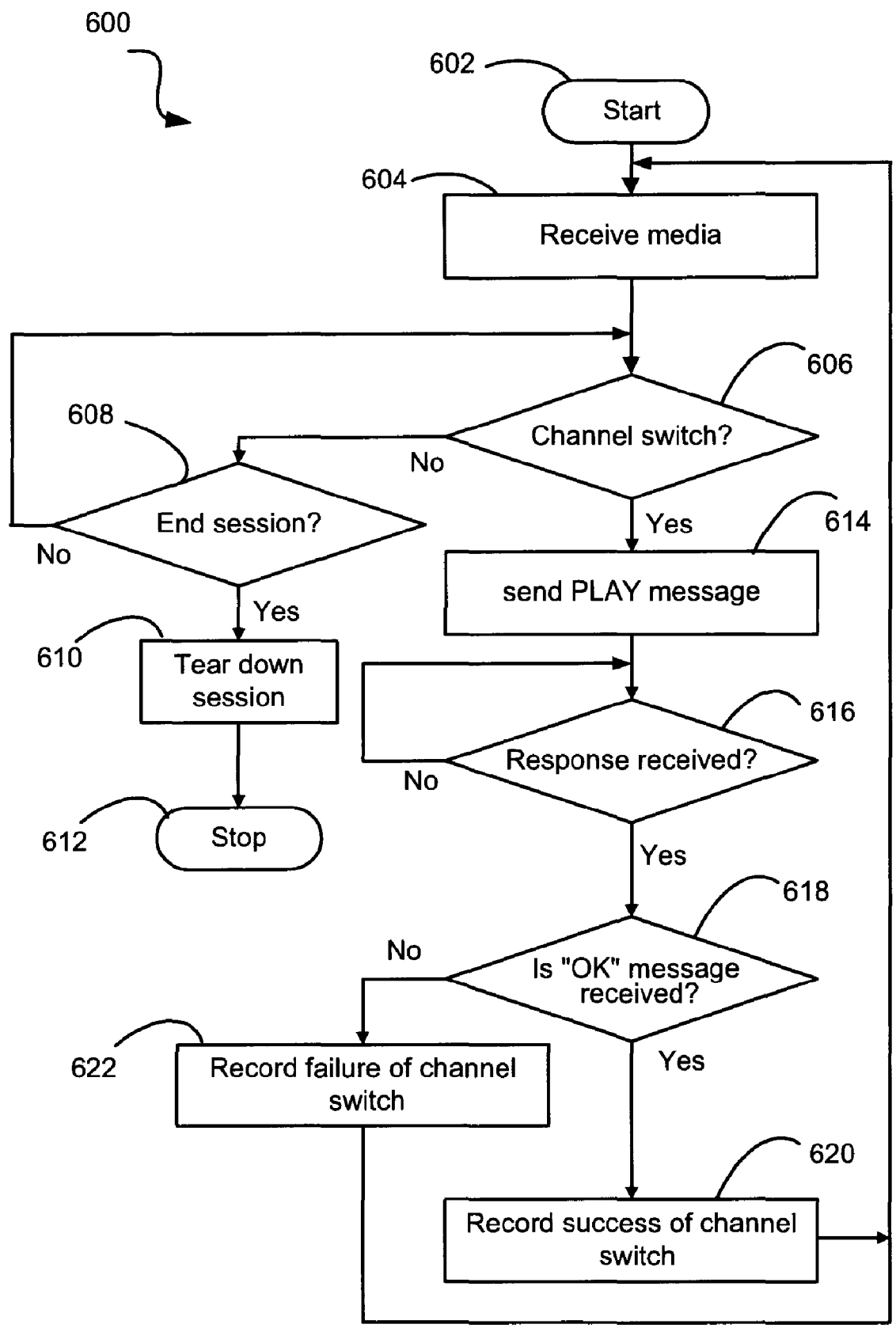
FIG. 6 shows a flowchart illustrating the step "Handle media receive session" of FIG. 5.

The step of the method captured in box 514 of FIG. 5 "Handle media receive session" is explained further with the help of flowchart 600 of FIG. 6. Upon start (box 602), the procedure 600 receives the original channel containing the desired media stream (box 604). While the media stream is being received, the procedure 600 continuously monitors whether or not the end-user 202 wishes to perform either a channel switching (box 606), or ending of the current session (box 608). Box 606 verifies if the end-user 202 wants to perform fast channel switching. If not, the procedure 600 exits "No" from box 606, and checks whether or not the end-user wants to end the session (box 608). If the end-user wants to end the session, the procedure 600 exits "Yes" from box 608, tears down the session (box 610), and exits (box 612). Otherwise it exits "No" from box 608, and loops back to the entry of box 606. If the end-user 202 desires to perform a fast channel switching, the procedure 600 exits "Yes" from box 606, and sends a PLAY RTSP message to the streaming server 108 (box 614). As discussed earlier, the "seek" functionality in the media player 104 is overloaded to trigger fast channel switching as described above. Information regarding the seek interval the endpoint of which corresponding to the new channel to be played is passed through the range parameter in the PLAY RTSP message. The procedure 600 then checks whether a response from the streaming server 108 is received (box 616). If the response has not arrived it exits "No" from box 616 and loops back to the entry of box 616. If the response has arrived it exits "Yes" from box 616, and checks whether or not an "OK" message was received (box 618). If an "OK" message has been received, the procedure 600 exits "Yes" from box 618, records the success of fast channel switching (box 620), and loops back to the entry of box 604 to receive the new media stream and to continue checking for further commands from the end-user 202. If an "OK" message was not received, the procedure 600 exits "No" from box 618, records the failure of fast channel switching (box 622) and loops back to the entry of box 604.

Figure 7:
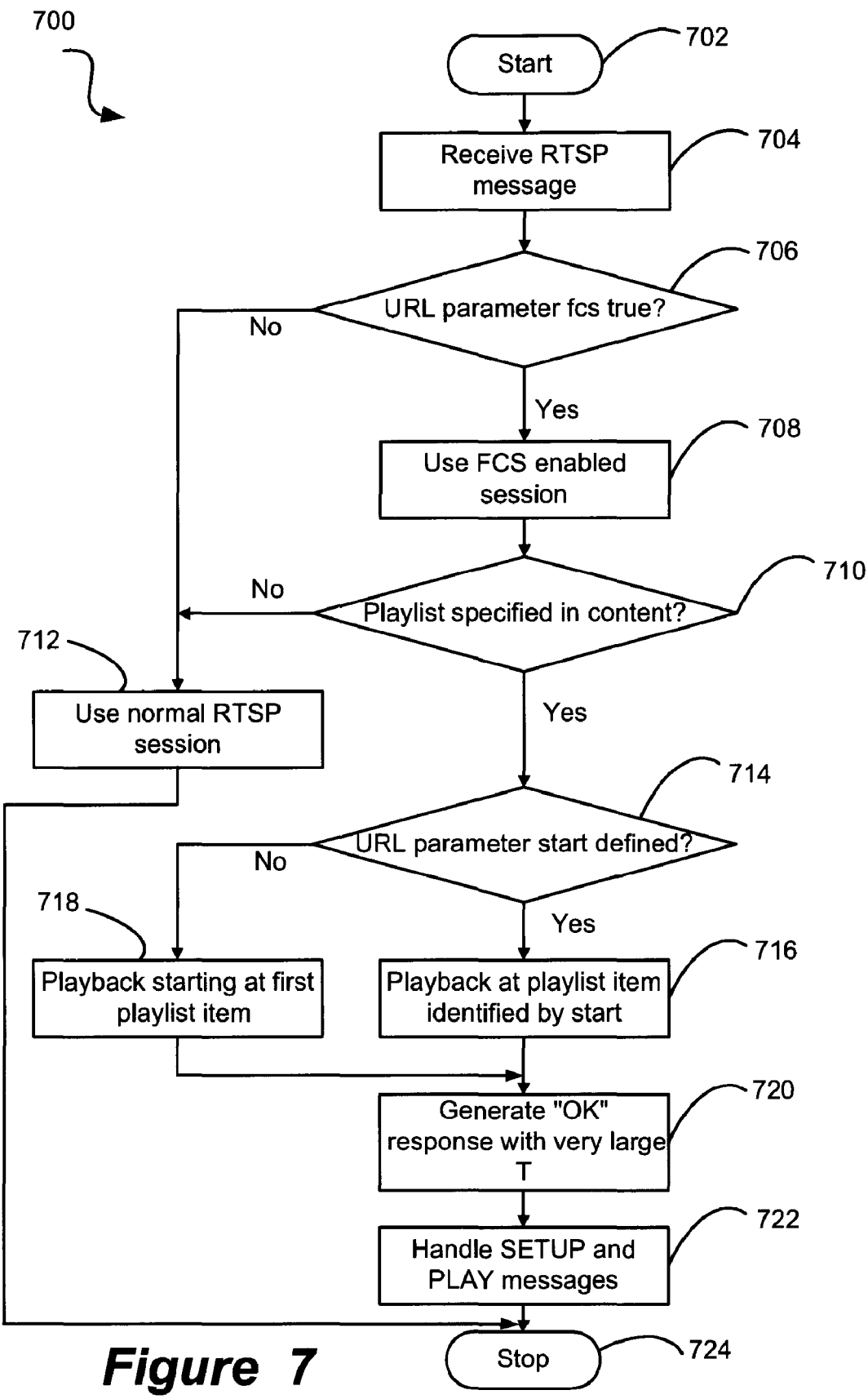
FIG. 7 shows a flowchart describing the steps of the method for fast channel switching deployed at the streaming server.

Flowchart 700 presented in FIG. 7 concerns the operations performed at the streaming server 108. Upon start (box 702), the streaming server 108 receives the RTSP message from the client 102 (box 704). Please note that this is the DESCRIBE message sent by the client 102 (as shown in box 504 of FIG.

5) to launch the RTSP session. The procedure 700 then checks whether or not a URL parameter "fcs" is set to "True" (box 706). If set to True, the procedure 700 exits "Yes" from box 706, and proceeds to the step "use a FCS enabled session" (box 708). Otherwise, the procedure 700 exits "No" from box 706, proceeds to the step "use a normal RTSP session" (box 712) and exits (box 724). For a FCS enabled session of box 708, the procedure 700 checks whether or not a playlist file 110 is specified in the content of the DESCRIBE message from the client 102 (box 710). If the playlist file 110 is not specified, the procedure 700 exits "No" from box 710, proceeds to the step "use a normal RTSP session" (box 712), and exits (box 724). If a playlist file 110 is specified it exits "Yes" from box 710, and checks whether or not the URL parameter "start" is defined (box 714). If defined, the procedure 700 exits "Yes" from box 714, and proceeds to the step "start the playback at the playlist item identified by the start parameter" (box 716). A playlist item is a channel listed in the playlist file 110. Otherwise, it exits "No" from box 714 and proceeds to the step "start the playback from the first item in the playlist" (box 718). After performing the operations described in boxes 716 and 718, the procedure 700 generates an "OK" response for the client 102 with a very large "npt" interval corresponding to the time duration T as discussed earlier (box 720). This enables the "seek" functionality in the media player 104 deployed by the client 102 even though a live media stream is viewed by the end-user 202. The procedure 700 then handles SETUP and PLAY RTSP messages from the client 102 (box 722), and exits (box 724).

Figure 8:
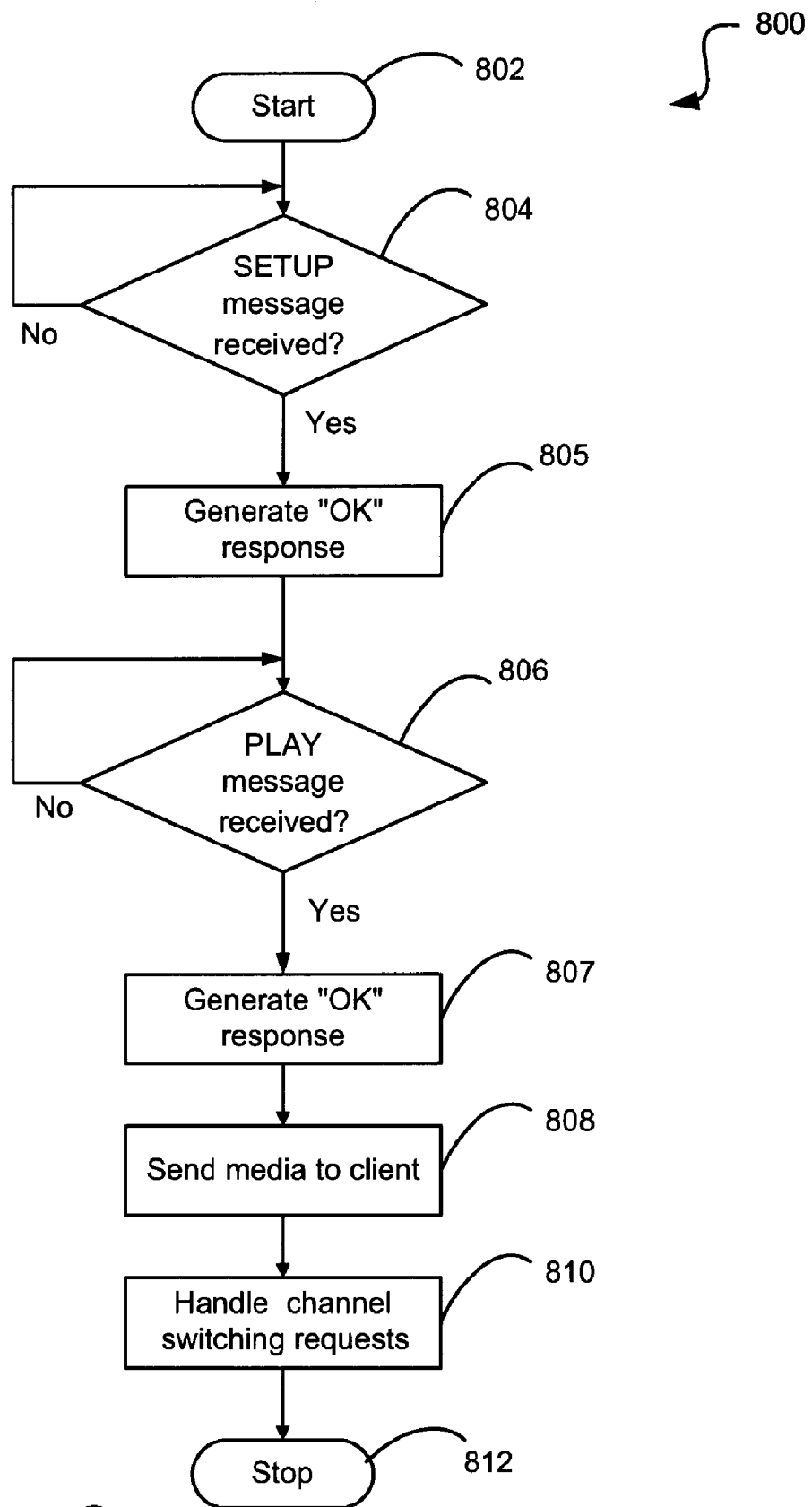
FIG. 8 shows a flowchart illustrating the step "Handle SETUP and PLAY messages" of FIG. 7.

The step of the method captured in box 722 "Handle SETUP and PLAY messages" is explained in further detail with the reference to flowchart 800 of FIG. 8. Upon start (box 802), the procedure 800 checks whether or not a SETUP RTSP message is received from the client 102 (box 804). If not received, the procedure 800 exits "No" from box 804, and loops back to the entry of box 804. If the SETUP RTSP message is received, the procedure 800 exits "Yes" from box 804, generates an "OK" message for the client 102 (box 805), and proceeds to check whether a PLAY message from the client 102 has arrived (box 806). If the PLAY message is not yet received, the procedure 800 exits "No" from box 806, and loops back to the entry of box 806. Once the PLAY request is received, the procedure 800 exits "Yes" from box 806, generates an "OK" response for the client 102 (box 807), and sends the requested channel to the client 102 (box 808). The procedure 800 then handles channel switch requests (box 810), and exits (812). Please note that the SETUP RTSP message and the PLAY RTSP message are generated by the client 102 in boxes 509 and 511 respectively of FIG. 5.

Figure 9:
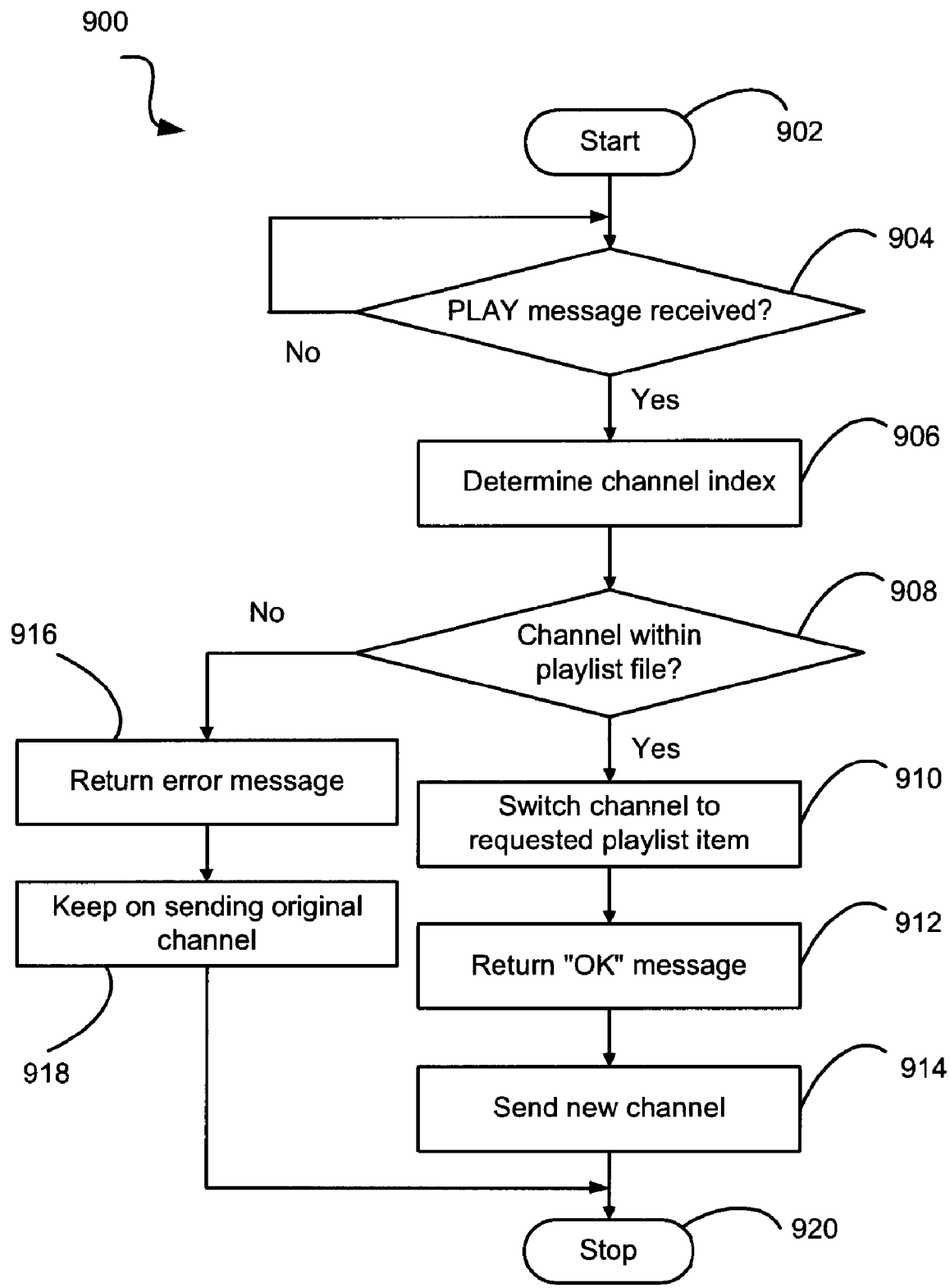
FIG. 9 shows a flowchart illustrating the step "Handle channel switching requests" of FIG. 8.

The step of the method captured in box 810 "Handle channel switching requests" is explained in further detail with the help of flowchart 900 of FIG. 9. Upon start (box 902), the procedure 900 checks whether a PLAY RTSP message is received from the client 102 (box 904). Please note that this PLAY message corresponding to a "seek" functionality is sent in box 614 in FIG. 6 by the client 102. If not received, it exits "No" from box 904, and loops back to the entry of box 904. Otherwise, it exits "Yes" from box 904, and computes the channel index (box 906) based on the range parameter included with the message. This is performed by using equation (1) that is explained earlier in this section. After computing the channel index, the procedure 900 checks whether or not the channel associated with the computed channel index is contained within the list of channels in the playlist file 110 (box 908). If not, it returns "No" from box 908, returns an error message to the client 102 (box 916), keeps on sending the original media stream (box 918), and exits (box 920). If the channel lies within the playlist file 110, the procedure 900 exits "Yes" from box 908, and switches the media stream to this new channel which corresponds to the playlist item occupying the position identified by the index (box 910). The procedure 900 returns an "OK" message to the client 102 (box 912), starts sending the new channel (box 914), and exits (box 920).

The method and system for fast switching of channels carrying live media streams described in the embodiments of the invention provide the following advantages:

- The channel switching is performed in-band within an existing RTSP session without having to initiate a new RTSP connection. This reduces delay as well as decreases the use of system resources such as processing power and bandwidth that are of particular importance in the context of resource constrained mobile devices;
- By overloading a "seek" functionality available in most media players, the method and system of the embodiments of the invention can handle existing media players that use standard RTSP messages and do not require FCS specific extensions proposed for the RTSP;
- The channel switching is performed in real time with the end-user experiencing a smooth instantaneous transition from the original channel being viewed to the new channel.

Various other modifications may be provided as needed. For example, instead of sending the name of a distinct playlist file 110 in the initial RTSP message from every client, a single playlist may be used by all clients for choosing channels to be played. The method can also support a client that does not use commercially available media playing software, but has the functionality for playing media streams built into the system.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method for switching between channels carrying live media streams transmitted from a streaming server to a client device, comprising a media player, under a Real Time Streaming Protocol (RTSP), the method comprising:
    (a) launching a RTSP session by sending a RTSP message from the client device to the streaming server for enabling channel switching within the RTSP session, the RTSP message including information regarding a playlist file stored at the streaming server, the playlist file comprising a list of channels available for playing by the media player;
    (b) at the client device, processing a request for channel switching from an original channel being played by the media player to a new channel from the playlist file, and sending another RTSP message including information regarding the new channel directly to the streaming server in-band within the RTSP session; and
    (c) processing said another RTSP message at the streaming server, and transmitting the new channel to the client device.

2. The method of claim 1, wherein the step comprises:
    overloading a seek functionality available in the media player to move backward and forward in a media stream stored in a computer readable medium; and
    triggering the request for channel switching and generating said another RTSP message.

3. The method of claim 2, wherein the overloading the seek functionality comprises:
- at the client device, receiving a seek request including a seek interval with an endpoint corresponding to an index of the new channel in the playlist file from the media player for switching to the new channel;
- determining a range parameter corresponding to the index of the new channel in the playlist file from the seek interval; and
- sending a PLAY RTSP message, including the range parameter, from the client device to the streaming server.

4. The method of claim 1, wherein the step (c) comprises:
- identifying the new channel in the playlist file, including processing the information regarding the new channel; and
- (b4) terminating transmitting the original channel, and transmitting the new channel to the client device without interrupting the RTSP session.

5. The method as described in claim 1, further comprising sending a response to the RTSP message, including specifying a maximum duration of the RTSP session for overloading the seek functionality of the media player, the step being performed before the step (b).

6. The method as described in claim 1, further comprising processing the new channel transmitted by the streaming server at the client device, the step being performed after the step (c).

7. The method of claim 6, wherein processing the new channel comprises buffering the new channel at the client device, and playing the new channel after a remaining part of the original channel that has arrived at the client device is played out.

8. A method for switching between channels carrying live media streams transmitted from a streaming server to a client device under a Real Time Streaming Protocol (RTSP), the method comprising:
- (a) launching a RTSP session by sending a RTSP message from the client device to the streaming server for enabling channel switching within the RTSP session, the RTSP message including information regarding a playlist file stored at the streaming server, the playlist file comprising a list of channels available for playing by the client device;
- (b) at the client device, sending another RTSP message for switching from an original channel being played at the client to a new channel from the playlist file directly to the streaming server in-band within the RTSP session, said another RTSP message including information regarding the new channel; and
- (c) processing said another RTSP message at the streaming server, and transmitting the new channel to the client device.

9. The method of claim 8, wherein the step (b) comprises:
- overloading a seek functionality available at the client device to move backward and forward in a media stream stored in a computer readable medium; and
- triggering a request for channel switching and generating the RTSP message.

10. The method of claim 9, wherein the overloading seek functionality comprises:
- at the client device, generating a seek interval with an endpoint corresponding to an index of the new channel in the playlist file for identifying the new channel;
- determining a range parameter corresponding to the index of the new channel in the playlist file from the seek interval; and
- sending a PLAY RTSP message, including the range parameter, from the client device to the streaming server.

11. The method of claim 8, wherein the step (c) further comprises:
- identifying the new channel in the playlist file by processing the information regarding the new channel; and
- terminating transmitting the original channel, and transmitting the new channel to the client device without interrupting the RTSP session.

12. A method for switching between channels carrying live media streams transmitted from a streaming server to a client device, including a media player, under a Real Time Streaming Protocol (RTSP), the method comprising:
- (a) launching a RTSP session between the client device and the streaming server for streaming an original channel from a playlist comprising a list of channels for playing by the media player; and
- (b) switching from the original channel to a new channel from the playlist in-band within the RTSP session, including overloading a seek functionality available in the media player to move backward and forward in a media stream stored in a computer readable medium, and triggering a request for switching between the original channel and the new channel.

13. The method of claim 12, wherein the step (b) further comprises:
- at the client device, receiving a seek request including a seek interval with an endpoint corresponding to an index of the new channel in the playlist from the media player for switching to the new channel;
- at the client device, determining a range parameter corresponding to the index of the new channel in the playlist from the seek interval;
- sending a PLAY RTSP message, including the range parameter, from the client device directly to the streaming server; and
- processing the PLAY RTSP message at the streaming server, and transmitting the new channel to the client device.

14. The method of claim 13, wherein the processing the PLAY RTSP message comprises:
- (a14) identifying the new channel in the playlist, including processing the range parameter; and
- (b14) terminating transmitting the original channel, and transmitting the new channel to the client device without interrupting the RTSP session.

15. A system for switching between channels carrying live media streams under a Real Time Streaming Protocol (RTSP), comprising:
- a client device comprising a media player;
- a streaming server transmitting the live media streams to the client device;

wherein the client device comprises:
- a computer readable storage medium having computer readable instructions stored thereon for execution by a processor, forming:
  - (a) a first RTSP handler module, processing RTSP messages between the client device and the streaming server for switching between channels, and launching a RTSP session by sending a RTSP message from the client device to the streaming server for enabling switching between channels within the RTSP session, the RTSP message including information regarding a playlist file stored at the streaming server, the playlist file comprising a list of channels available for playing by the media player;

(b) a client fast channel switching module, processing a request for switching between channels from an original channel being played by the media player to a new channel from the playlist file, and sending another RTSP message through the RTSP handler module directly to the streaming server in-band within the RTSP session launched by the first RTSP handler module, said another RTSP message including information regarding the new channel; and wherein the streaming server comprises:
a computer readable storage medium having computer readable instructions stored thereon for execution by a processor, forming:
(c) a server fast channel switching module, processing the another RTSP message, and transmitting the new channel to the client device.

16. The system of claim 15, wherein the client fast channel switching module comprises:
an interface module, receiving a seek request including a seek interval with an endpoint corresponding to an index of the new channel in the playlist file from the media player for overloading a seek functionality available in the media player for switching to the new channel; and
a first computation module, determining a range parameter corresponding to the index of the new channel in the playlist file from the seek interval, and sending a PLAY RTSP message, including the range parameter, from the client device to the streaming server.

17. The system of claim 15, wherein the server fast channel switching module comprises:
a second RTSP handler module, processing RTSP messages between the client device and the streaming server; and
a second computation module, identifying the new channel in the playlist file, including processing the information regarding the new channel.

18. The system of claim 15, wherein the client device further comprises a storage module, having a computer readable medium having computer readable instructions stored thereon for execution by a processor, for buffering the new channel and playing the new channel after a remaining part of the original channel that has arrived at the client device is played out.

19. A system for switching between channels carrying live media streams transmitted under a Real Time Streaming Protocol (RTSP), comprising:
a client device;
a streaming server transmitting the live media streams to the client device;
wherein the client device comprises:
a computer readable storage medium having computer readable instructions stored thereon for execution by a processor, forming:
(a) a RTSP handler module, processing RTSP messages between the client device and the streaming server for switching between channels, and launching a RTSP session by sending a RTSP message from the client device to the streaming server for enabling switching between channels within the RTSP session, the RTSP message including information regarding a playlist file stored at the streaming server, the playlist file comprising a list of channels available for playing by the client device; and
(b) a client fast channel switching module, sending another RTSP message through the RTSP handler module for switching from an original channel being played at the client device to a new channel from the playlist file directly to the streaming server in-band within the RTSP session, said another RTSP message including information regarding the new channel; and wherein the streaming server comprises:
a computer readable storage medium having computer readable instructions stored thereon for execution by a processor, forming:
(c) a server fast channel switching module, processing the RTSP message sent from the channel switching module, and transmitting the new channel to the client device.

20. A system for switching between channels carrying live media streams transmitted under a Real Time Streaming Protocol (RTSP), comprising:
a client device comprising a media player;
a streaming server transmitting the live media streams to the client device;
wherein the client device comprises:
a computer readable storage medium having computer readable instructions stored thereon for execution by a processor, forming:
(a) a client fast channel switching module, launching a RTSP session between the client device and the streaming server for streaming an original channel from a playlist comprising a list of channels for playing by the media player; and switching from the original channel to a new channel from the playlist in-band within the RTSP session, by overloading a seek functionality available in the media player to move backward and forward in a media stream stored in a computer readable medium, and triggering a request for switching between the original channel and the new channel; and
wherein the streaming server comprises:
a computer readable storage medium having computer readable instructions stored thereon for execution by a processor, forming:
(b) a server fast channel switching module, processing the request for switching received directly from the client device for transmitting the new channel to the client device.

21. A computer program product for switching between channels, carrying live media streams transmitted under a Real Time Streaming Protocol (RTSP) from a streaming server to a client device, comprising a media player, the computer program product comprising a computer readable medium having computer readable program code means embodied in said medium for causing said computer to perform the steps of the method as described in claim 1.

22. A method for switching between channels carrying live media streams transmitted from a streaming server to a client device, having a media player, under a Real Time Streaming Protocol (RTSP), the method comprising:
launching a RTSP session between the client device and the streaming server for streaming an original channel from a playlist stored on the streaming server, the playlist comprising a list of channels for playing by the media player; and
switching from the original channel to a new channel in the playlist in-band within the RTSP session, including overloading an existing functionality of the media player to indicate an index of the new channel in the playlist, and triggering a request for switching between the original channel and the new channel.

23. A client device having a media player, comprising:
a client fast channel switching module, comprising a computer readable storage medium having computer readable instructions stored thereon for execution by a processor, for launching a RTSP session between the client device and a streaming server for streaming an original channel from a playlist stored on the streaming server, the playlist comprising a list of channels for playing by the media player; and switching from the original channel to a new channel in the playlist in-band within the RTSP session, by overloading an existing functionality of the media player to indicate an index of the new channel in the playlist, and triggering a request for switching between the original channel and the new channel.

* * * * *